(12) United States Patent
Shah et al.

(10) Patent No.: US 11,062,611 B2
(45) Date of Patent: Jul. 13, 2021

(54) AUTONOMOUS FLEET MANAGEMENT

(71) Applicant: Ford Global Technologies, LLC, Dearborn, MI (US)

(72) Inventors: Ayush Chandrakanth Shah, Belleville, MI (US); Oleg Yurievitch Gusikhin, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 324 days.

(21) Appl. No.: 16/180,477

(22) Filed: Nov. 5, 2018

(65) Prior Publication Data

US 2020/0143688 A1    May 7, 2020

(51) Int. Cl.
| | |
|---|---|
| *G01C 22/00* | (2006.01) |
| *G05D 1/00* | (2006.01) |
| *G08G 1/00* | (2006.01) |
| *G05D 1/02* | (2020.01) |
| *B60N 3/16* | (2006.01) |
| *G06Q 30/02* | (2012.01) |
| *G06Q 50/30* | (2012.01) |
| *G01C 21/34* | (2006.01) |
| *G07B 15/00* | (2011.01) |
| *G07B 15/02* | (2011.01) |
| *G06Q 30/00* | (2012.01) |

(52) U.S. Cl.
CPC .............. *G08G 1/202* (2013.01); *B60N 3/16* (2013.01); *G01C 21/3453* (2013.01); *G05D 1/0088* (2013.01); *G05D 1/0291* (2013.01); *G06Q 30/0265* (2013.01); *G06Q 50/30* (2013.01); *G05D 2201/0213* (2013.01)

(58) Field of Classification Search
CPC ...... G08G 1/202; B60N 3/16; G01C 21/3453; G05D 1/0088; G05D 1/0291; G05D 2201/0213; G06Q 50/30; G06Q 30/0265; G06Q 30/0623; B60R 25/241; B60R 25/2018; B60R 25/2036
USPC ................................... 701/27; 705/13, 26.61
See application file for complete search history.

(56) References Cited

U.S. PATENT DOCUMENTS

| | | | |
|---|---|---|---|
| 2015/0332425 A1* | 11/2015 | Kalanick ................ | G06Q 50/10 705/13 |
| 2015/0363830 A1* | 12/2015 | Abuelsaad ......... | G06Q 30/0266 705/14.63 |
| 2017/0282821 A1 | 10/2017 | Zych | |
| 2019/0061688 A1* | 2/2019 | Watanabe ............. | B60R 25/241 |
| 2019/0268743 A1* | 8/2019 | Cho ................. | G08G 1/096791 |

OTHER PUBLICATIONS

Chowdhary, Anirban Sen, "Dynamic CloudHub Deployment From Mule Application," DZone: Integration Zone, Nov. 7, 2016, https://dzone.com/articles/dynamic-cloudhub-deployment-from-mule-application, 4 pages.

* cited by examiner

*Primary Examiner* — Mahmoud S Ismail
(74) *Attorney, Agent, or Firm* — Michael Spenner; Brooks Kushman, P.C.

(57) ABSTRACT

An autonomous vehicle includes a display interface. The vehicle includes a controller configured to execute commands to transport a passenger from a pickup location to a destination and display a brand name or logo associated with a brand identifier during at least a portion of the transport. The execution is responsive to a request for transportation service including the brand identifier, the pickup location, and the destination.

19 Claims, 5 Drawing Sheets

AUTONOMOUS FLEET MANAGEMENT

TECHNICAL FIELD

This disclosure relates to fleet management of autonomous vehicles.

BACKGROUND

Autonomous fleets may provide passenger travel without requiring selection of vehicles or service providers. Autonomous fleets may also result in passenger experiences lacking a branded or tailored experience. Independently-branded fleet vehicles may improve customer experience in conventional and nonconventional fleet vehicles.

SUMMARY

A method by a transportation management server includes receiving a request for transportation service including a brand identifier, a pickup location, and a destination for a passenger. The method further includes outputting a brand name or logo corresponding to the brand identifier to an autonomous vehicle. The method further includes directing the autonomous vehicle to the pickup location to transport the passenger to the destination. The method further includes directing the autonomous vehicle to display the brand name or logo on an interface of the autonomous vehicle during at least a portion of the transport. The method further includes transmitting a digital access key associated with the autonomous vehicle to authorize the passenger with access to the vehicle.

An autonomous vehicle includes a display interface. The vehicle includes a controller configured to execute commands to transport a passenger from a pickup location to a destination and display a brand name or logo associated with a brand identifier during at least a portion of the transport. The execution is responsive to a request for transportation service including the brand identifier, the pickup location, and the destination.

A method by a transportation management server includes receiving a request for transportation service including a brand identifier, a pickup location, and a destination for a passenger. The method includes outputting a brand name or logo corresponding to the brand identifier to an autonomous vehicle. The method includes directing the autonomous vehicle to the pickup location to transport a passenger to the destination. The method includes directing the autonomous vehicle to output sound associated with the brand information during at least a portion of the transport. The method includes transmitting a digital access key associated with the autonomous vehicle to authorize the passenger with access to the vehicle.

As described below, such embodiments should not be limited beyond those as recited in the claims.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Autonomous fleets may be branded according to a customer vehicle lease. The customer vehicle lease may be received from a third-party service provider, vendor, or leaseholder. The third-party maintains a particular client experience with brand recognition. Meaning, a particular client may continue using the third-party for ride-sharing or other services because of the experience provided. The autonomous fleet may be configured to meet the needs of multiple third-party services. These needs may include visual, aural, and experiential customizations so that clients can identify the third-party upon pickup or delivery.

Fleets may be configured to provide more than ride-sharing or passenger transportation. Fleets may also include delivery services. The delivery service may deliver, among other things, food to destinations. The food may be delivered warm or cooked, cool or frozen, or at a predetermined temperature set by the third-party service or client. For example, food delivery may be provided by a fleet service as requested by a third-party service or client. The requestor may define an operating schedule for the food delivery. The operating schedule ensures that the frozen or uncooked food retrieved is cooked and ready upon delivery to the client. Alternatively, the operating schedule may ensure the warm or cooked food retrieved is chilled or frozen upon delivery to the client. Each requestor may include brand-specific instructions for cooking the food item. For example, the requestor may specify the maximum cook time of the item. The requestor may specify the maximum temperature of the item. The requestor may specify the defrost time of the item. The requestor may specify the cooldown time of the item. The requestor may specify a cooking profile of the item. Any cooking-related parameter may be specified by the brand or requestor. The food item may be any edible item (e.g., pizza, soup, bread, sandwiches, meats, poultry, seafood, pasta).

Specific problems may arise with fleet based autonomous food delivery. Traffic, for example, may be encountered en route to the delivery location. The traffic may accelerate or delay the fleet vehicles time of arrival, thereby causing the food item to be over or under cooked. Traffic models may be used to predictively adjust the operating schedule such that the food item is delivered as statistically close to done as possible without going over. The analysis may be skewed such that food items are always predicted to arrive under-cooked and briefly finish cooking upon arrival at the destination to ensure the food item is not burned or overcooked. This may be a part of the brand-specific operating schedule. Indeed, food delivery can include an item cooked en route without overcooking from traffic or other delays.

Figure 1:
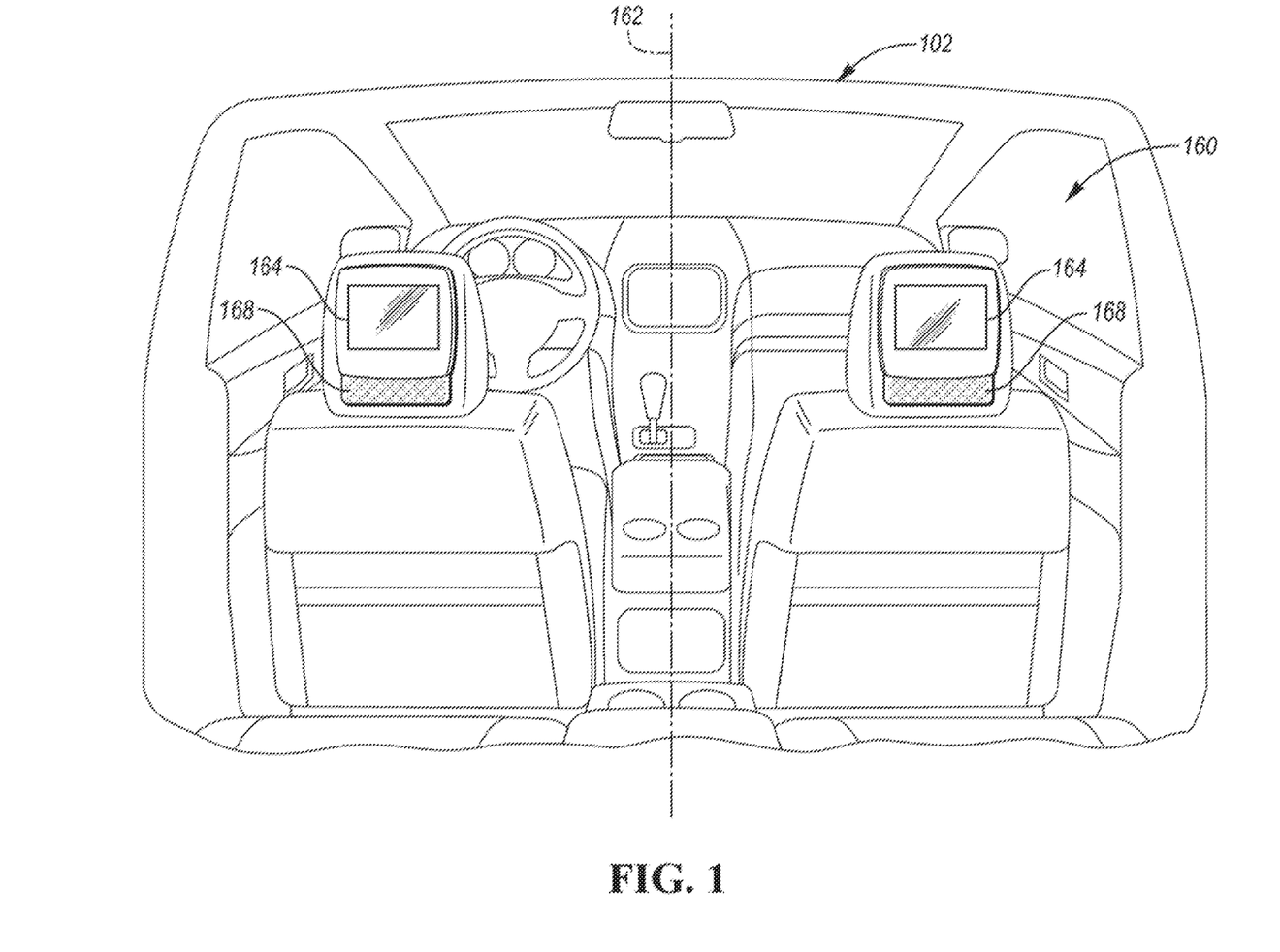
FIG. 1 is an isometric view of the interior of a vehicle.

FIG. 1 illustrates a vehicle 102 having a passenger compartment 160. The passenger compartment 160 includes sections indicated by dividing line 162. The sections include individual interfaces 164, 166 to display brand identification information to passengers. The sections may also include sound production equipment 168 to produce aural sounds for passengers. The brand information display on the interface may be related to a third-party ride-sharing service. The third-party service may order transportation from a transportation server described in FIG. 3. The brand identification may provide a passenger with assurances that they are in the correct vehicle 102 with a feeling that the vehicle 102 is provided from the third-party service and not the fleet manager that controls the vehicle 102.

Figure 3:
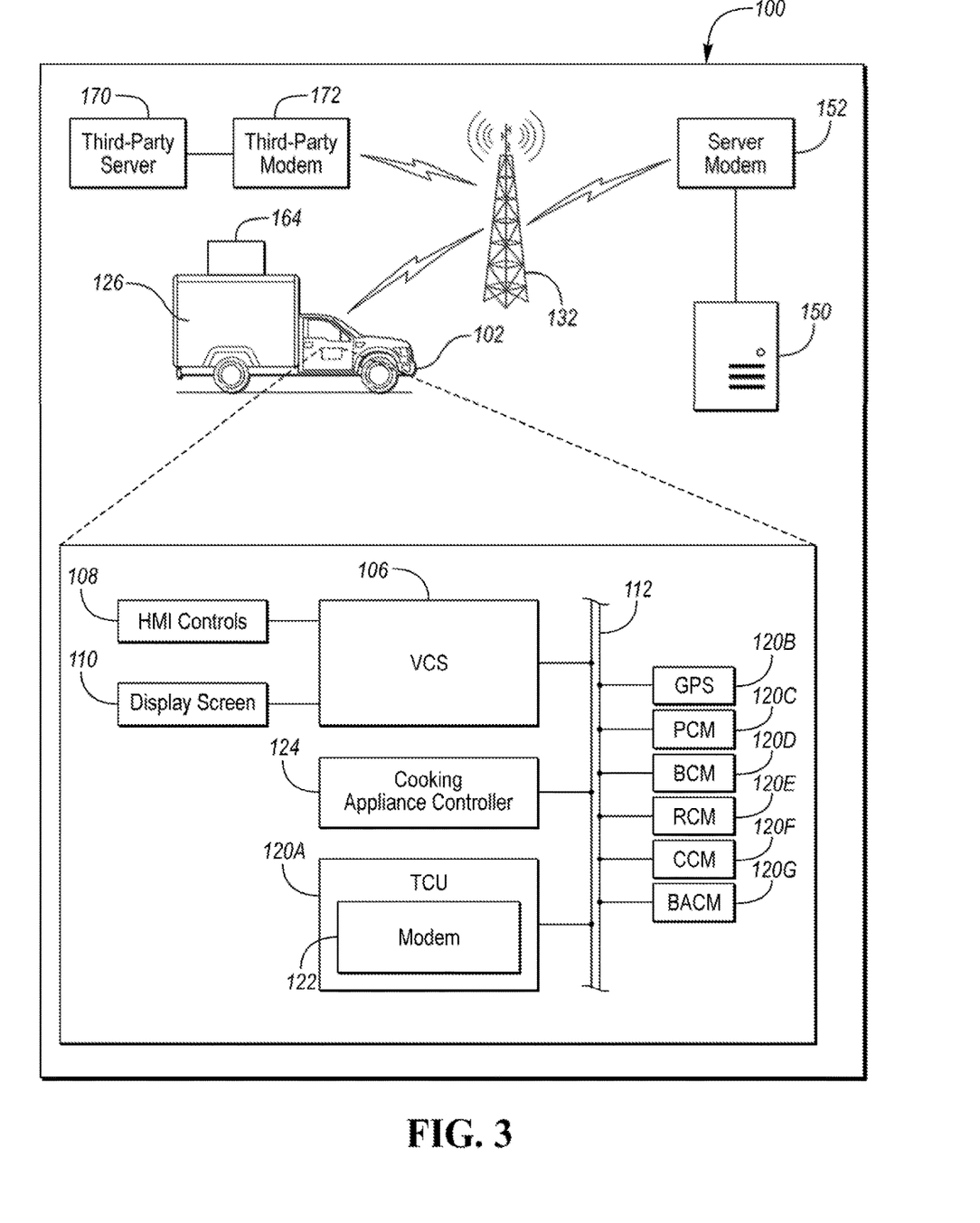
FIG. 3 is a schematic view of a vehicle of an autonomous fleet.

The brand identifier may be placed on an interface 164, 166 on external portion of the vehicle 102 as shown in FIG. 3. Any type of brand indication may be provided to the passengers such that association with the third-party service is recognized. For example, any picture, emblem, word mark, trademark, trade dress, color organization, digital imagery, or other signification may be provided on the interfaces 164, 166. The interfaces 164, 166 may further be configured to release scents or otherwise activate the senses of the passenger to recognize the third-party provider. Additionally, sounds may be produced such as songs, jingles, dings, and horns that passengers associate with a particular third-party provider. A jingle may be a short melody or song associated with a brand such that an occupant may recognize the brand by hearing it aurally. The jingle may be contemporary commercial music or music in advertising. Any type of brand recognizable sound may be a jingle.

Figure 2:
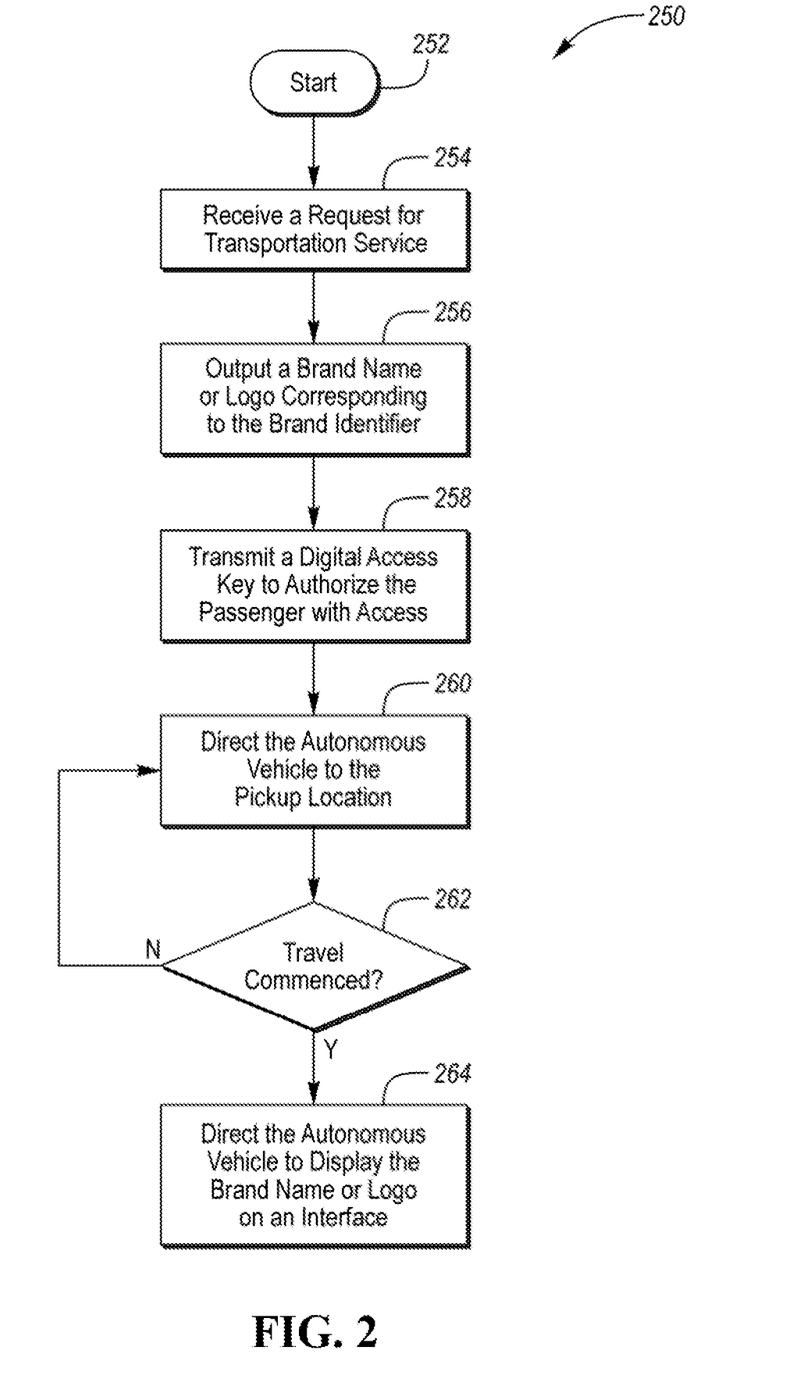
FIG. 2 is an algorithm describing a method of displaying brand information in a fleet vehicle.

FIG. 2 discloses an algorithm 250 for display third-party information in a vehicle 102 to a passenger. In step 252, the algorithm 250 begins. In step 254, the transportation management server 150, as shown in FIG. 3, receives a request from the third-party server 170 for transportation, including a brand identifier. The brand identifier may be an associated key entry in a database of the transportation server 150 or provide another means for the server 150 to lookup brand information related to the third-party provider. The transportation request may further include the number of passengers, the pickup location, and the destination. In step 256, the management server retrieves a brand name or logo corresponding to the brand identifier from a database and sends the brand name or logo to the vehicle 102.

In step 258, the transportation management server 150 provides access keys to the fleet vehicle 102 to the passenger. The keys may be provided to the passenger via the third-party service provider. The access keys may be cryptographically signed to provide authorization to the vehicle 102. In step 260, the vehicle 102 is directed to the pickup location. The vehicle 102 may be directed to display the brand information while en route to the pickup location or display the information when the vehicle 102 arrives at the pickup location. Externally communicated brand information may be displayed as soon as the lease is arranged between the third-party (third-party server 170) and the fleet manager (fleet management server 150). In step 262, the brand information is display as soon as the travel commences. The travel may be considered to commence when the vehicle 102 travels to the pickup location, when the passenger occupies the vehicle 102, or at the discretion of the transportation management server 150. Once travel has commenced, the transportation server 150 displays the brand information on the interface 164. As described above, sounds may also be produced.

FIG. 3 illustrates an example system 100 including a vehicle 102 implementing an always listening answer retrieval algorithm. The vehicle 102 may include a vehicle computing system (VCS) 106 configured to communicate over a wide-area network using a telematics control unit (TCU) 120A. The TCU 120A may have various modems 122 configured to communicate over respective communications paths and protocols. While an example system 100 is shown in FIG. 3, the example components as illustrated are not intended to be limiting. Indeed, the system 100 may have more or fewer components, and additional or alternative components and/or implementations may be used.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume.

The VCS 106 may be configured to support voice command and BLUETOOTH interfaces with the driver and driver carry-on devices, receive user input via various buttons or other controls, and provide vehicle status information to a driver or other vehicle 102 occupant(s). An example VCS 106 may be the SYNC® system provided by FORD MOTOR COMPANY of Dearborn, Mich.

The VCS 106 may further include various types of computing apparatus in support of performance of the functions of the VCS 106 described herein. In an example, the VCS 106 may include one or more processors configured to execute computer instructions, and a storage medium on which the computer-executable instructions and/or data may be maintained. A computer-readable storage medium (also referred to as a processor-readable medium or storage) includes any non-transitory (e.g., tangible) medium that participates in providing data (e.g., instructions) that may be read by a computer (e.g., by the processor(s)). In general, a processor receives instructions and/or data, e.g., from the storage, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C#, Fortran, Pascal, Visual Basic, Python, Java Script, Perl, PL/SQL, etc.

The VCS 106 may be configured to communicate with TCU 120A. The TCU 120A may include one or more modems 122 capable of packet-switch or circuit-switched signaling. The TCU 120A may control the operation of the modems 122 such that a suitable communication path is used. The modems may be configured to communicate over a variety of communications paths. The paths may be configured with circuit-switched, packet-switched, signaling, or combination thereof. For example, the packet-switched communication may be long-term evolution (LTE) communications. In some circumstances the circuit-switch 130 communication path may be SIGTRAN or another implementation, carrying circuit-switched signaling information over IP. The underlying signaling information is, however, still formatted under the circuit-switched protocol.

The VCS 106 may also receive input from human-machine interface (HMI) controls 108 configured to provide for occupant interaction with the vehicle 102. For instance, the VCS 106 may interface with one or more buttons or other HMI controls 108 configured to invoke functions on the VCS 106 (e.g., steering wheel audio buttons, a push-to-talk button, instrument panel controls, etc.). The VCS may further be part of an autonomous controller or an autonomous vehicle controller. The VCS 106 may also drive or otherwise communicate with one or more displays 110 configured to provide visual output to vehicle occupants, e.g., by way of a video controller. In some cases, the display 110 may be a touch screen further configured to receive user touch input via the video controller, while in other cases the display 110 may be a display only, without touch input capabilities. In an example, the display 110 may be a head unit display included in a center console area of the vehicle 102 cabin. In another example, the display 110 may be a screen of a gauge cluster of the vehicle 102.

The VCS 106 may be further configured to communicate with other components of the vehicle 102 via one or more in-vehicle networks 112 or vehicle buses 112. The in-vehicle networks 112 may include one or more of a vehicle controller area network (CAN), an Ethernet network, and a media oriented system transfer (MOST), as some examples. The in-vehicle networks 112 may allow the VCS 106 to communicate with other vehicle 102 systems, such as a vehicle modem of the TCU 120A (which may not be present in some configurations), a global positioning system (GPS) module 120B configured to provide current vehicle 102 location and heading information, and various other vehicle ECUs configured to cooperate with the VCS 106. As some non-limiting possibilities, the vehicle ECUs may include a powertrain control module (PCM) 120C configured to provide control of engine operating components (e.g., idle control components, fuel delivery components, emissions control components, etc.) and monitoring of engine operating components (e.g., status of engine diagnostic codes); a body control module (BCM) 120D configured to manage various power control functions such as exterior lighting, interior lighting, keyless entry, remote start, and point of access status verification (e.g., closure status of the hood, doors and/or trunk of the vehicle 102); a radio transceiver module (RCM) 120E configured to communicate with key fobs or other local vehicle 102 devices; a climate control management (CCM) 120F module configured to provide control and monitoring of heating and cooling system components (e.g., compressor clutch and blower fan control, temperature sensor information, etc.); and a battery control module (BACM) 120G configured to monitor the state of charge or other parameters of the battery 104 of the vehicle 102.

In an example, the VCS 106 may be configured to access the communications features of the TCU 120A by communicating with the TCU 120A over a vehicle bus 112. As some examples, the vehicle bus 112 may include a controller area network (CAN), an Ethernet bus, or a MOST bus.

The VCS 106 may communicate with the transportation management server or server 150 via a server modem 152 using the communications services of the modems 122 over the network 132. The transportation management server 150 may provide functionality related to navigation, traffic, fleet vehicle requests, and location information. The transportation management server 150 may also receive requests via the server modem 152 and network 132 from third-party services. The third-party services may communicate with the transportation server 150 via a third-party server 170 and third-party modem 172. Indeed, multiple third-party providers may communicate with the transportation management server 150 to request fleet vehicles 102. The requested vehicles 102 may be configured to display the third-party providers brand information such that passengers know the origin of the vehicle 102 they enter or are riding in. The brand information may be display on an interface 164 on external portions of the vehicle 102, as shown on a roof of the vehicle 102. Additionally, external speakers or sounds may provide passengers with notification that their brand of third-party service is near.

The transportation management server 150 may provide the operating schedule for the cooking appliance 126 to be used by the cooking appliance controller 124. The cooking appliance 126 may be disposed on any portion within or outside of the vehicle. The cooking appliance 126 may be any type of food preparation appliance (e.g., grill, oven, microwave, freezer, blender, coffee maker, food processor). The controller 124 may be configured to control the appliance, as necessary. The controller 124 may heat the oven according to an operating schedule or blend the blender according to an operating schedule.

Figure 4:
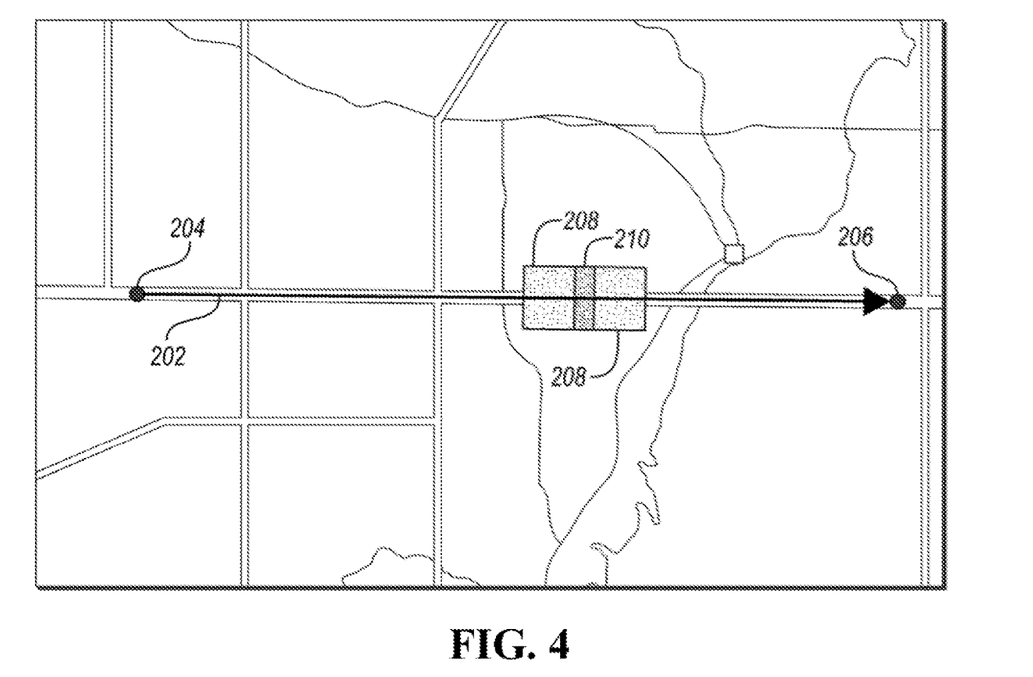
FIG. 4 is a map including a route having a beginning and a destination.

Referring to FIG. 4, a map 200 is shown. The map 200 includes a route 202. The route 202 includes a start or beginning 204 and an end or destination 206. Along the route is predicted traffic delay 208. The predicted traffic delay 208 may have a predicted delay amount. The predicted delay amount may include a certainty factor and a magnitude. The certainty factor depicts the reliability of the delay information and the magnitude depicts the delay duration. While traversing the route, the vehicle 102 may encounter an actual traffic delay 210.

Figure 5:
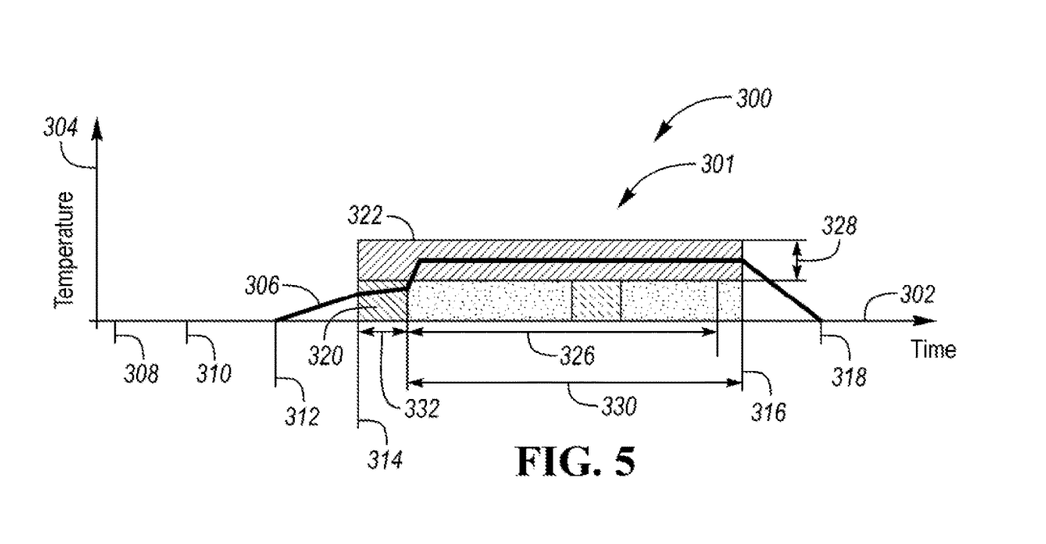
FIG. 5 is a timeline of a fleet vehicle delivery service.

Referring to FIG. 5, a timeline 300 is shown. The timeline shows the temperature 304 of cooking appliance 126 with respect to time 302 along temperature curve 306. As an example, the temperature curve 306 may depict a portion of an operating schedule 301. The operating schedule 301 may include any actions performed by the controller 124 to ensure the proper cooking of the food item in the appliance 126 (e.g., start cooking, stop cooking, warm appliance, cooldown, warm food item, blend food item, cool item). The cooking appliance 126 may be any type of cooking appliance including non-heating types. At time 308 the server 150 or vehicle 102 receives a delivery request. The server 150 may send the request to the vehicle 102. The server 150 may receive the request from a third-party service or provider. The request may include the operating schedule and other brand-specific information for how the vehicle 102 should deliver the food item (e.g., signage, sound, operating schedules, temperatures, limits). At time 310 the vehicle 102 departs to start the route 202. The vehicle 102 may receive the delivery request at time 308 while located at a fleet parking area and travel to the start 204 of the route 202. At time 312, the appliance controller 124 begins to warm the cooking appliance 126 to some degree. As the cooking appliance warms, the vehicle travels to the start 204 of the route 202. As the start 204 of the route 202 is reached, the vehicle 102 has already warmed the cooking appliance 126. At the start 204 of the route 202, the third-party provider may place a food item in the cooking appliance. While a listing of food items is impractical, a non-limiting example may be a pizza. Meaning, the cooking appliance may be a pizza oven and the food item may be a pizza.

As a selection is made by the third-party provider to continue the route 202, the vehicle beings to cook the food item according to the operating schedule 301. The maximum cook time 326 may be based on the cooking temperature 306. The cooking temperature 306 may include cooking temperature variations 328, which are intended to limit the total heat imparted to the food item. For example, if the maximum cook time 326 is anticipated to be exceeded, the controller 124 may lower the cooking temperature to limit the heat imparted in the food item. An anticipated traffic delay 208 along the route may be associated with a delay 332 or an early cooldown 316 to ensure the maximum cook time 326 is not exceeded. The commencement of the operating schedule may be delayed by the delay time 332. Further, the controller 124 may ensure that a minimum cook time 330 is exceeded before delivery 318. If necessary, the vehicle 102 may park before reaching the destination or at the destination 206 to further cook the food item if the minimum cook time 330 is not exceeded.

An additional problem arises to ensure excessive warming of the food item does not occur with an earlier than necessary cooldown at time 316. For example, the maximum cook time could not be exceeded by cooking the food item at maximum temperature from the start and warming the food item until delivery. While this is contemplated as an alternative in this disclosure, an improvement may be realized by estimating the traffic delay 208 and merely warming the food item with sufficient delay 332 until the maximum cook time 326 is equal to the estimated delivery time 318 plus cooldown 316. This ensures the food item has reached its maximum cook time 326 as close to the delivery time 318 as possible. A buffer may be added to the delay time 332 based on the certainty of the anticipated traffic delay 208. For example, if the machine algorithm in the server 150 determines that there is a 50% likelihood of traffic based on historical occurrences (e.g., rush hour) then the delay time 332 may be proportionately adjusted. Meaning, a 50% likelihood of traffic may reduce the delay time 332 by 50%. Further, machine learning may learn and correlate the certainty of traffic delay 208 with the delay time 332 to minimize the difference between cooking completion and cooldown time 316 and the delivery 318. A predetermined maximum threshold may be determined for the acceptable amount of cooldown before delivery. The predetermined maximum threshold may be the amount of time the food item takes to cool before being consumable. For example, pizza sauce may burn a patron's mouth above temperatures of 160° F.

Figure 6:
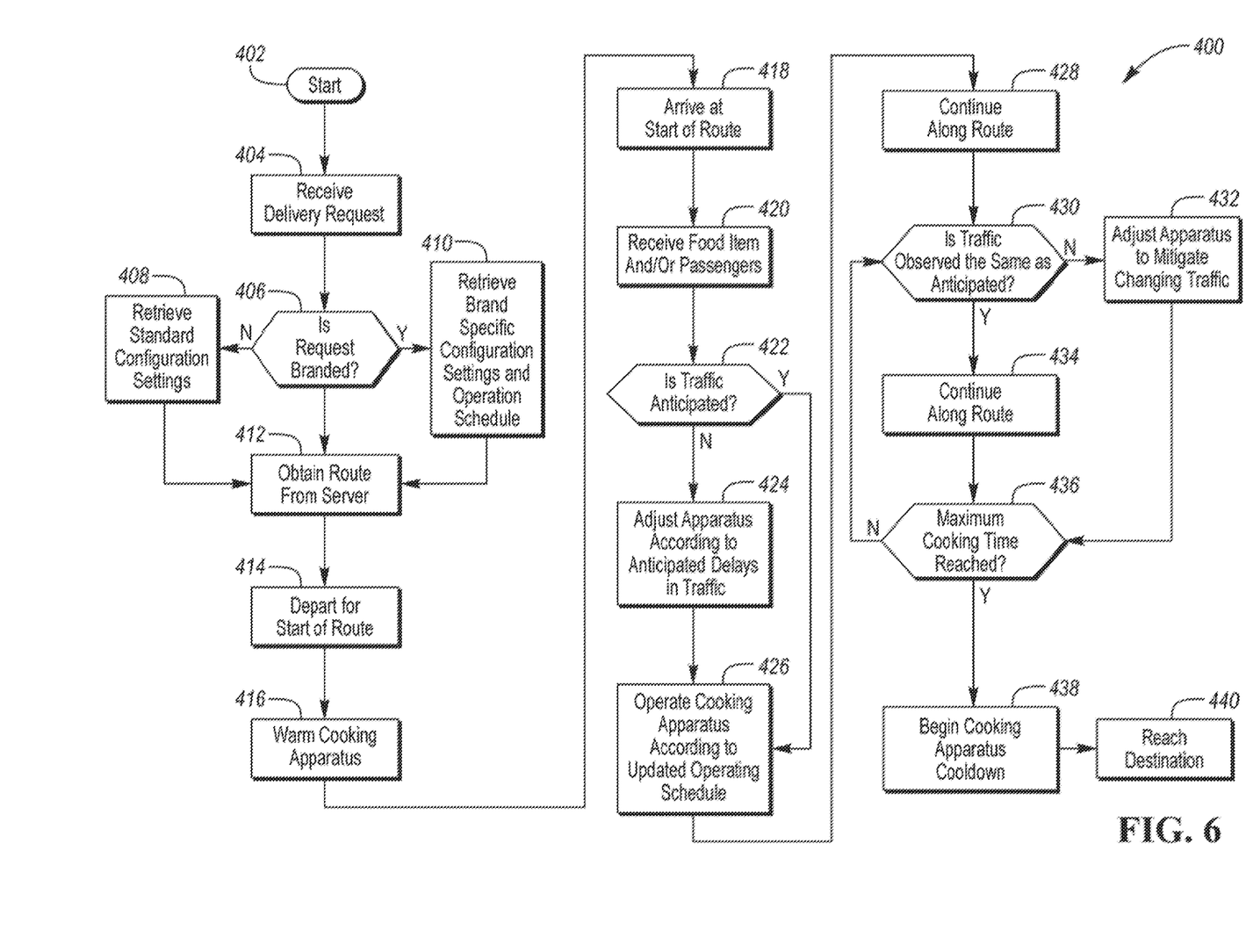
FIG. 6 is an algorithm for a fleet vehicle delivery service.

Referring to FIG. 6, and algorithm 400 is shown. The algorithm 400 may include steps that are rearranged or omitted when applied. The algorithm 400 begins in step 402. In step 404, the vehicle 102 or server 150 receive a delivery request or updated leaseholder. In step 406, the server 150 or vehicle 102 determine whether the request is branded. If the request is branded, the server 150 will retrieve brand specific configuration settings for the vehicle 102 and for the cooking appliance 126. For example, the vehicle branding may include signage depicting the third-party service leasing the fleet vehicle. The brand information may be displayed on an interface (e.g., display screen 110, HMI controls 108). The branding may be played aurally. The brand information may indicate the products or services that are provided by the leaseholder or third-party requestor. The brand information may include imagery (e.g., logos, slogans, tradedress, trademarks) or other identifying marks to indicate the source of the ride provider.

As another example, the third-party service may have specific cooking requirements. For example, one pizza company may have thin crust pizzas that cook at 900° F. Another pizza company may have pan pizzas that cook at 350° F. The operating schedule 301 may account for these differences in temperature while warming or cooling down the cooking appliance and determining the temperature variations 328. If the branding is not specified the server 150 will send standard configuration settings, which may include fleet branding. In step 412, the server 150 sends a predetermined route 202 to the vehicle 102. In step 414 the vehicle 102 departs for the start 204 of the route 202. During transit to the beginning of the route 202, the vehicle controller 124 may begin warming the cooking appliance 126. When the vehicle 102 arrives at the start 204 of the route 202, the vehicle may receive food and pick up passengers in step 420. The controller 124 may further adjust the temperature of the cooking appliance according to the operating schedule 301. If traffic is anticipated in step 422, the controller may adjust the delay time 332 in order to anticipate the traffic 208. In step 426 the cooking appliance is operated according to the updated operating schedule including the delay. In step 428, the vehicle 102 continues along the route 202. In step 430, the vehicle 102 or server 150 determine whether the traffic observed 210 is the same as the predicted traffic 208 or within the predicted band of traffic 208. If the traffic observed 210 is not similar to the predicted, the operating schedule 301 may be adjusted to account for the discrepancy or otherwise raise or lower the temperature of the cooking appliance 126 to account for the discrepancy in step 432. The vehicle 102 will also notify the server 150 that the discrepancy was observed so that the machine learning algorithm used to predict traffic is improved. In step 434, the vehicle 102 continuous along the route. If the maximum cook time is reached in step 436, the cooking appliance will begin cooldown in step 438. In step 440, the vehicle 102 reaches its destination.

It should be appreciated that temperature is used as one example of many parameters that may be a part of the operating schedule and may not be available on all cooking appliances disposed on vehicles of the fleet. Other examples of parameters similar to temperature may include pressure, agitator operation time, blending time, freezing time, thawing time. The parameter may be anything controlled by the controller 124 to prepare food. It should further be appreciated that performance of any or all of the actions depicted in this disclosure may be performed by any of the controllers or processors of the vehicle 102 or server 150 interchangeably.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A method implemented on a transportation management server comprising:
    receiving a request for transportation service including a brand identifier, a pickup location, and a destination for a passenger;
    outputting a brand name or logo corresponding to the brand identifier to an autonomous vehicle;
    directing the autonomous vehicle to the pickup location to transport the passenger to the destination;
    directing the autonomous vehicle to display the brand name or logo on an interface of the autonomous vehicle during at least a portion of the transport;
    transmitting a digital access key associated with the autonomous vehicle to authorize the passenger with access;
    receiving a delivery request defining another destination, and anticipated duration of a route to the another destination, and an operating schedule with a maximum cook time for a cooking appliance; and
    directing the autonomous vehicle to selectively deviate from the operating schedule while traveling the route based on traffic encountered such that the maximum cook time is not exceeded.

2. The method of claim 1, wherein the portion of the transport includes displaying the brand name or logo before arriving at the pickup location.

3. The method of claim 1, wherein the brand identifier includes sound associated with the brand.

4. The method of claim 3, wherein the sound is a jingle.

5. The method of claim 1, further comprising, displaying different brand names or logos on different displays in the vehicle based on the request.

6. The method of claim 5, wherein the interface is on an exterior of the vehicle.

7. The method of claim 6, wherein the interface is on a roof of the vehicle.

8. An autonomous vehicle comprising:
    a display interface; and
    a controller configured to,
        responsive to a request for transportation service including a brand identifier, a pickup location, and a destination, execute commands to transport a passenger from the pickup location to the destination and display a brand name or logo associated with the brand identifier during at least a portion of the transport; and
        responsive to receiving a delivery request defining another destination, an anticipated duration of a route to the another destination, and an operating schedule with a maximum cook time for a cooking appliance, selectively deviate from the operating schedule while traveling the route based on traffic encountered such that the maximum cook time is not exceeded.

9. The vehicle of claim 8, wherein the identifier includes digital imagery related to products or services of a third-party service.

10. The vehicle of claim 8, wherein the brand identifier includes an operating schedule.

11. The vehicle of claim 8, wherein a minimum cook time is exceeded before the another destination is reached.

12. The vehicle of claim 8, wherein a commencement of the operating schedule is based on the anticipated duration.

13. The vehicle of claim 8, wherein a delay time from the operating schedule is based on a machine learning algorithm that includes traffic history of the route.

14. The vehicle of claim 8, wherein the operating schedule includes a cooking temperature of the cooking appliance.

15. The vehicle of claim 14, wherein the cooking temperature is based on a certainty of the anticipated duration.

16. The vehicle of claim 14, wherein the cooking temperature is adjusted according to an estimated time until arrival when the traffic encountered is different from a traffic delay incorporated in the anticipated duration.

17. The vehicle of claim 14, wherein the cooking temperature is reached en route to a pickup location of the route.

18. The vehicle of claim 8, wherein the operating schedule includes a defrost duration.

19. A method implemented on a transportation management server comprising:
    receiving a request for transportation service including a brand identifier, a pickup location, and a destination for a passenger;
    outputting a brand name or logo corresponding to the brand identifier to an autonomous vehicle;
    directing the autonomous vehicle to the pickup location to transport a passenger to the destination;
    directing the autonomous vehicle to output sound associated with the brand identifier during at least a portion of the transport;
    transmitting a digital access key associated with the autonomous vehicle to authorize the passenger with access to the vehicle;
    receiving a delivery request defining another destination, and anticipated duration of a route to the another destination, and an operating schedule with a maximum cook time for a cooking appliance; and
    directing the autonomous vehicle to selectively deviate from the operating schedule while traveling the route based on traffic encountered such that the maximum cook time is not exceeded.

* * * * *